(12) United States Patent
Holm et al.

(10) Patent No.: US 11,422,013 B2
(45) Date of Patent: Aug. 23, 2022

(54) SENSOR HOUSING

(71) Applicant: Danfoss A/S, Nordborg (DK)

(72) Inventors: Jørgen Grønbæk Holm, Nordborg (DK); Hans-Henning Hansen, Nordborg (DK); Veenith Shetty, Nordborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 17/292,539

(22) PCT Filed: Nov. 8, 2019

(86) PCT No.: PCT/EP2019/080719
§ 371 (c)(1),
(2) Date: May 10, 2021

(87) PCT Pub. No.: WO2020/099271
PCT Pub. Date: May 22, 2020

(65) Prior Publication Data
US 2021/0396553 A1    Dec. 23, 2021

(30) Foreign Application Priority Data

Nov. 13, 2018   (DE) .......................... 102018128385.7

(51) Int. Cl.
*G01D 11/24*    (2006.01)
*F16L 41/00*    (2006.01)

(52) U.S. Cl.
CPC .......... *G01D 11/245* (2013.01); *F16L 41/008* (2013.01)

(58) Field of Classification Search
CPC ............................ G01D 11/245; F16L 41/008
See application file for complete search history.

(56) References Cited

U.S. PATENT DOCUMENTS

| 2007/0280780 | A1* | 12/2007 | Bruehl | .................. | F16L 41/008 |
| | | | | | 403/179 |
| 2012/0248763 | A1* | 10/2012 | Nakamura | ............ | F16L 37/008 |
| | | | | | 285/305 |
| 2018/0187811 | A1 | 7/2018 | Scholz et al. | | |
| 2019/0063648 | A1* | 2/2019 | Chen | ...................... | F16L 27/08 |

FOREIGN PATENT DOCUMENTS

| WO | 2007063390 A1 | 6/2007 | |
| WO | WO-2007063390 A1 * | 6/2007 | .......... F16L 37/1225 |
| WO | 2019041122 A1 | 3/2019 | |

OTHER PUBLICATIONS

International Search Report for PCT Serial No. PCT/EP2019/080719 dated Jan. 27, 2020.

* cited by examiner

*Primary Examiner* — Jamel E Williams
(74) *Attorney, Agent, or Firm* — McCormick, Paulding & Huber PLLC

(57) ABSTRACT

A sensor housing (1) including a longitudinal axis (2), a clamping area (3) surrounding the longitudinal axis (2) and a recess (4) in the clamping area (3) is described, the recess (4) running in circumferential direction. In such a sensor housing a recess in the clamping area (3) should be provided with low production costs. To this end the recess (4) is formed between a part 6 of the housing (1) and a locking element (5) fixed to the housing (1).

20 Claims, 1 Drawing Sheet

SENSOR HOUSING

CROSS-REFERENCE TO RELATED APPLICATIONS

This application is a National Stage application of International Patent Application No. PCT/EP2019/080719, filed on Nov. 8, 2019, which claims priority to German Application No. 102018128385.7 filed on Nov. 13, 2018, each of which is hereby incorporated by reference in its entirety.

TECHNICAL FIELD

The present invention relates to a sensor housing comprising a longitudinal axis, a clamping area surrounding the longitudinal axis, and a recess in the clamping area, the recess running in circumferential direction.

BACKGROUND

The sensor housing can be used as part of a pressure sensor or a temperature sensor which can be mounted on fluid systems, for example refrigeration systems, hydraulic systems or engines.

A sensor which is arranged in a fluid system may be subjected to vibrations and/or shock.

In order to overcome or at least reduce problems which are caused by such vibrations and/or shock, it has been proposed not only to mount the sensor housing to the fluid system, but to secure the sensor housing to a rigid structure or a vibration damping element by use of screws, threaded bolts and nuts.

Such elements are, however, difficult to mount in systems or remote locations, where there is only limited space to handle the parts and the necessary tools.

The more sophisticated solution is the use of a kind of hose clamp surrounding the clamping area. In order to reduce the possibility of axial movements of the sensor housing, the hose clamp is provided with a radially inwardly extending protrusion which, however, requires a corresponding recess in the clamping area of the sensor housing. The recess can be in form of a circumferentially running groove. When the protrusion of the hose clamp or a similar clamping ring has been inserted into the recess, the sensor housing is locked against a movement in axial direction.

However, the manufacturing of such a recess or groove in the clamping area is difficult and expensive, in particular in case the clamping area is in a massive flange portion of the housing which often has a polygon shape outer surface for a mounting tool. Further, the longitudinal extension of the massive flange may be too limited to accommodate such recess or groove, while still being used as a surface for mounting tools and/or for product marking.

SUMMARY

The object underlying the invention is to provide a recess in the clamping area of the sensor housing with low production costs.

This object is solved with a sensor housing as described at the outset in that the recess is formed between the part of the housing and a locking element fixed to the housing.

Such a solution has the advantage that it is no longer necessary to form the recess or a corresponding groove by machining of the housing. It is only necessary to fix the locking element to the housing so that a gap is formed between the locking element and a part of the housing in the clamping area. The width of the gap can be determined by the mounting position of the locking element. The protrusion of the hose clamp or any other clamping ring can then be inserted into the gap between the locking element and the housing so that the sensor housing is protected against an axial movement, i. e. a movement parallel to the longitudinal axis.

In an embodiment of the invention the housing comprises an extension having a cross section area smaller than a cross section area of the clamping area, wherein the locking element is fixed to the extension. The locking element can then be fixed to the circumference of the extension and the axial position of the extension, i. e. a position in a direction parallel to the longitudinal axis of the sensor housing, defines the width of the gap or recess between the locking element and the part of the housing mentioned above.

In an embodiment of the invention the extension is arranged coaxially to the longitudinal axis. This has the advantage that the locking element can as well be arranged coaxially to the longitudinal axis so that mounting is facilitated.

In an embodiment of the invention the locking element at least partly surrounds the extension. This means that the recess or gap formed between the locking element and the above-mentioned part of the housing in the clamping area is formed at least over the same circumferential part of the extension on which the locking element is arranged.

In an embodiment of the invention the extension is of cylindrical form. The cylindrical form is simple to produce, for example by turning. The locking element can be mounted on the cylindrical extension without taking care of the angular position of the locking element. The extension may have a tapered section at the end facing away from the housing.

In an embodiment of the invention the extension extents perpendicularly from a face of the housing. This face of the housing which can be termed "permanent clamping surface" defines one side of the groove or recess which accommodates the projection of the clamping ring.

In an embodiment of the invention a groove is formed in the extension and the locking element is in form of a clip element which is snapped into the groove. A groove in a cylindrical part can easily be produced. Since the extension is of smaller cross section the groove is shorter in circumferential direction than a corresponding groove on the outer circumference of the clamping area. The groove needs only a relatively small depth since it is provided for holding the locking element only.

In an embodiment of the invention the clip element is E-shaped. In other words, it is in form of a ring (which needs not necessarily be of circular form) having a number of protrusions pointing radially inwardly, wherein the protrusions are inserted into the groove. An angular distance between the outer most protrusions is more than 180° so that the clip element can be pushed into the groove on the extension by elastically deforming the clip until it snaps around the bottom surface of the groove in the extension. An axial surface of the clip element facing the permanent clamping surface can be termed "temporary clamping surface". The permanent clamping surface and the temporary clamping surface together limit the recess in axial direction which is intended to receive the projection of the clamping ring.

In another embodiment the locking element is in form of a locking washer which is mounted on the extension. The locking washer comprises an outer ring element with several elastically deformable sections protruding in a radially inwardly direction from the ring. The inside diameter of the washer is slightly smaller than the outer diameter of the extension. The locking washer can be mounted on the cylindrical extension and pushed towards the permanent clamping surface until the distance between the outer ring of the washer and the permanent clamping surface corresponds to the predetermined distance or width of the recess. The inner end surfaces of the deformable sections will engage with the surface of the extension and be deformed in an axial direction opposite to the mounting direction. Hereby, the washer will be locked against a movement in this direction. The washer will be able to withstand the axial loads from the clamping element occurring under normal operation of the fluid system.

In an embodiment of the invention a working section of the sensor extents from the extension. The working section can comprise a sensor itself and/or determine a physical property of the fluid in the system. Alternatively, the working section can form a channel to guide the fluid into other parts of the sensor housing.

In an embodiment of the invention the working section has a cross section smaller than that of the extension. When mounting the locking element, the working section is not disturbing.

In an embodiment of the invention the working section comprises a threaded portion. The threaded portion can comprise an outer thread or an inner thread. It can be used to connect the sensor housing to the fluid system.

BRIEF DESCRIPTION OF THE DRAWINGS

Preferred embodiments of the invention will now be described in more detail with reference to the drawing, wherein.

DETAILED DESCRIPTION

Figure 1:
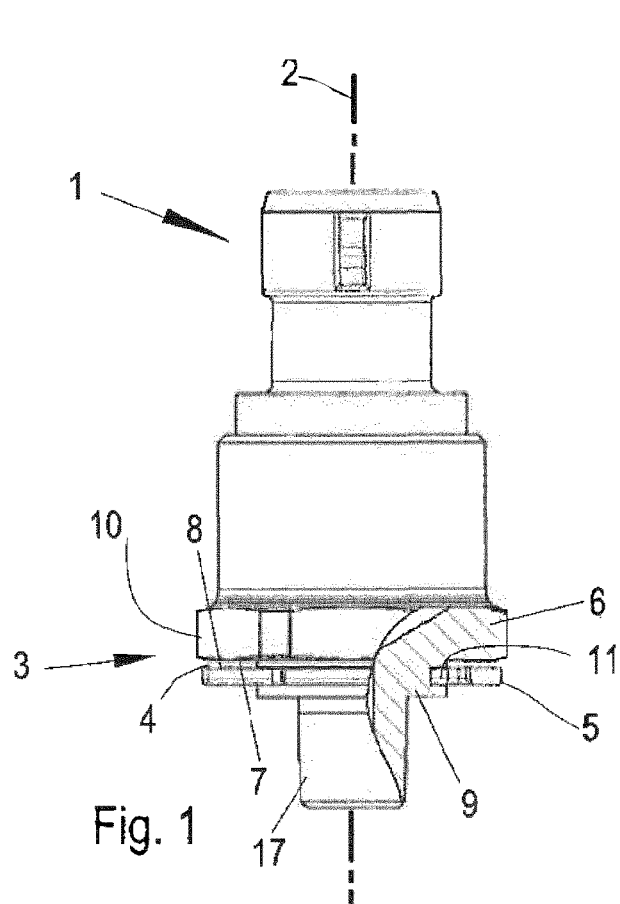
FIG. 1 shows a first embodiment of a sensor housing partly broken away.
Figure 2:
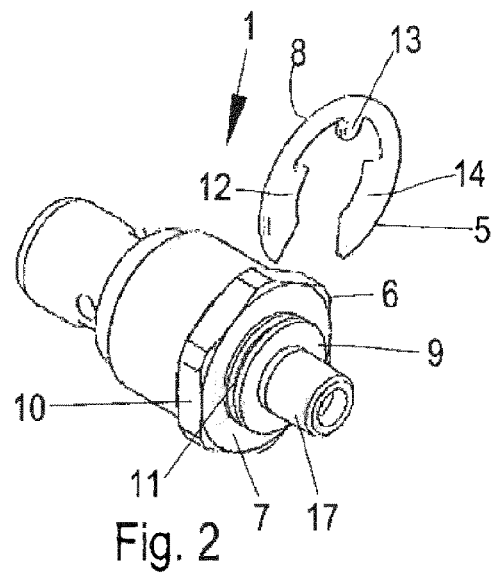
FIG. 2 shows a perspective view of the first embodiment of the sensor housing.

In the following description the same elements are referred to with the same reference numerals throughout all figures.

A sensor housing 1 comprises a longitudinal axis 2 and a clamping area 3 surrounding the longitudinal axis 2. A recess 4 is provided in the clamping area 3. The recess 4 runs in circumferential direction, which does not necessarily mean that it is through going in circumferential direction.

The recess 4 is formed between a locking element 5 and a part 6 of the housing 1. The part 6 of the housing comprises a permanent clamping surface 7. The locking element 5 comprises a temporary clamping surface 8.

An extension 9 extents perpendicularly from the permanent clamping surface 7, i. e. from the part 6 of the housing. As can be seen, the part 6 of the housing can be provided with a polygonal outer surface 10, for example a hexagon, which can be used for a mounting tool.

The extension 9 has a cross section which is smaller than the cross-section area of the clamping area 3, more precisely smaller than the cross section area of the housing part 6. The extension 9 is of cylindrical outer form. The extension 9 extents coaxially with the longitudinal axis 2.

The extension 9 is provided with a groove 11 running in circumferential direction. The locking element 5 is in form of a spring ring having radially inwardly projecting protrusions 12, 13, 14. The outermost protrusions 12, 14 have an angular distance of more than 180°. Accordingly, the locking element 5 is in form of a E-shaped clip element which can be pushed into the groove 11 by pressing it in radial direction (related to the longitudinal axis 2) into the groove 11. During such mounting the locking element 5 is elastically deformed and the protrusions 12, 13, 14 snap around the bottom surface of the groove 11.

The temporary clamping surface 8 is an axial surface of the locking element facing the permanent clamping surface 7 of the housing part 6. Accordingly, along the largest part of the circumference of the sensor housing 1 the locking element forms together with the axial surface of the housing part 6 the recess 4. The distance of the radial groove 11 from the permanent clamping surface 7 defines the width of the recess 4.

The connection of the locking element 4 and the extension 9 can withstand high axial loads. The locking element 5 is a cheap standard part and it is removable from the sensor housing 1, if no special vibration damping is required.

Figure 3:
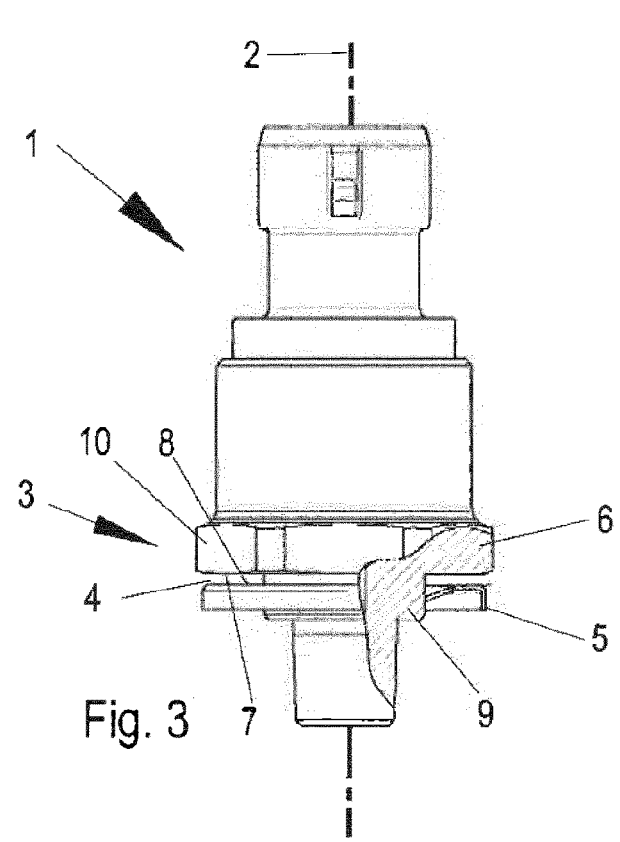
FIG. 3 shows a second embodiment of a sensor housing, partly broken away.
Figure 4:
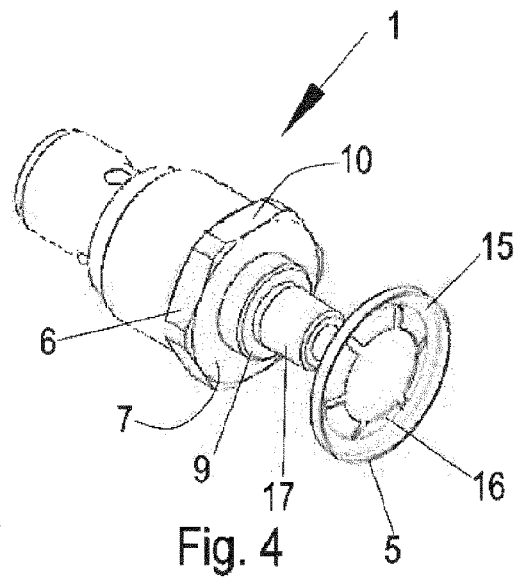
FIG. 4 shows a perspective view of the second embodiment of the sensor housing.

FIGS. 3 and 4 show a second embodiment of a sensor housing 1 in which the locking element 5 is in form of a locking washer. The locking element 5 comprises an outer ring element 15 with several elastically deformable sections 16 protruding in a radially inwardly direction from the ring 15. The inside diameter of the locking element 5 is slightly smaller than the outer diameter of the cylindrical extension 9 of the sensor housing 1. The locking element 5 can be pushed onto the cylindrical extension 9 and pushed towards the permanent clamping surface 7, until the distance between the temporary clamping surface 8 of the locking element 5 and the permanent clamping surface 7 of the housing section 6 corresponds to the predetermined or desired width of the recess 4. The inner end surfaces of the deformable sections 16 will engage with the surface of the cylindrical extension 9 and be deformed in an axial direction opposite to the mounting direction. Hereby, the locking element 5 will be locked against the movement in this direction.

The locking element 5 will be able to withstand the axial loads from the clamping element. The radially inwardly projecting parts of a hose clamp are inserted into the recess 4, under normal operation of the fluid system.

Such a sensor housing 1 allows the use of relatively cheap components for the locking element 5 to enable a remote and fast installation of a sensor arrangement in an opening of a fluid system.

The sensor housing 1 can comprise at least one sensor to determine a physical property of the fluid in the system, e. g. a pressure sensor or a temperature sensor, arranged within the sensor housing 1.

To this end the sensor housing 1 is provided with a working section 17 which extends from the extension 9 and has a smaller cross-section area than the extension 9. The working section 17 can likewise be of cylindrical outer form. It forms a step to the extension 9.

The working section 17 can be used to accommodate the sensor mentioned above. Additionally or alternatively the working section 17 can be provided with a channel guiding the fluid from the system into other parts of the sensor housing 1. Furthermore, the working section 17 can be provided with an inner thread or with an outer thread to enable mounting of the sensor housing 1 to the fluid system.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A sensor housing comprising
   a longitudinal axis,
   a housing part surrounding the longitudinal axis and having an axially-facing clamping surface,
   an extension surrounding the longitudinal axis and extending from the axially-facing clamping surface,
   a circumferential groove extending around the extension, the groove being axially-spaced from the axially-facing clamping surface, and
   a locking element located in the groove,
   wherein a circumferential recess is formed between the axially-facing clamping surface and the locking element.

2. The sensor housing according to claim 1, wherein the extension has a cross section area smaller than a cross section area of the housing part, wherein the locking element is fixed to the extension.

3. The sensor housing according to claim 2, wherein the extension is arranged coaxially to the longitudinal axis.

4. The sensor housing according to claim 3, wherein the locking element at least partly surrounds the extension.

5. The sensor housing according to claim 4, wherein the extension is of cylindrical form.

6. The sensor housing according to claim 4, wherein the extension extends perpendicularly from the axially-facing clamping surface of the housing part.

7. The sensor housing according to claim 4, wherein the locking element is a clip element which is snapped into the groove.

8. The sensor housing according to claim 3, wherein the extension is of cylindrical form.

9. The sensor housing according to claim 3, wherein the extension extends perpendicularly from the axially-facing clamping surface of the housing part.

10. The sensor housing according to claim 3, wherein the locking element is a clip element which is snapped into the groove.

11. The sensor housing according to claim 2, wherein the extension is of cylindrical form.

12. The sensor housing according to claim 2, wherein the extension extends perpendicularly from the axially-facing clamping surface of the housing part.

13. The sensor housing according to claim 2, wherein the locking element is a clip element which is snapped into the groove.

14. The sensor housing according to claim 13, wherein the clip element is E-shaped.

15. The sensor housing according to claim 2, wherein the locking element is a locking washer.

16. The sensor housing according to claim 2, wherein a working section of the sensor housing extends from the extension.

17. The sensor housing according to claim 16, wherein the working section has a cross section area smaller than that of the extension.

18. The sensor housing according to claim 16, wherein the working section comprises a threaded portion.

19. The sensor housing according to claim 1, wherein the locking element is a planar clip element.

20. The sensor housing according to claim 1, wherein the locking element is a locking washer that encircles the extension.

* * * * *